(12) United States Patent
Pan

(10) Patent No.: US 11,522,384 B2
(45) Date of Patent: Dec. 6, 2022

(54) FAST CHARGING DEVICE FOR MOBILE ELECTRONIC DEVICE

(71) Applicant: CHANNEL WELL TECHNOLOGY CO., LTD., Taoyuan (TW)

(72) Inventor: Yi-An Pan, Taoyuan (TW)

(73) Assignee: CHANNEL WELL TECHNOLOGY CO., LTD., Taoyuan (TW)

( * ) Notice: Subject to any disclaimer, the term of this patent is extended or adjusted under 35 U.S.C. 154(b) by 199 days.

(21) Appl. No.: 17/152,903

(22) Filed: Jan. 20, 2021

(65) Prior Publication Data
US 2022/0060044 A1 Feb. 24, 2022

(30) Foreign Application Priority Data

Aug. 19, 2020 (TW) ................................ 109128180

(51) Int. Cl.
*H02J 7/00* (2006.01)
*H02J 7/04* (2006.01)

(52) U.S. Cl.
CPC .............. *H02J 7/04* (2013.01); *H02J 7/0068* (2013.01); *H02J 2207/30* (2020.01); *H02J 2310/22* (2020.01)

(58) Field of Classification Search
USPC ......................................................... 320/137
See application file for complete search history.

(56) References Cited

U.S. PATENT DOCUMENTS

| 6,456,511 B1* | 9/2002 | Wong ...................... H02M 1/36 363/21.13 |
| 9,209,676 B2* | 12/2015 | Geren ..................... H02M 1/32 |
| 2017/0310160 A1* | 10/2017 | Wan ........................ F21V 3/062 |
| 2018/0034379 A1* | 2/2018 | Zhang ............... H02J 7/007182 |

\* cited by examiner

*Primary Examiner* — Samuel Berhanu

(57) ABSTRACT

A fast charging device for mobile electronic device is disclosed. Particularly, an input-end filtering unit contained in the fast charging device is designed to comprise two first input capacitors, one second input capacitor, and one switch element. By such design, in case of a rated voltage of an input AC power being smaller than 110 Vac, the switch element is controlled to complete a switch-ON operation, so as to make the input-end filtering unit execute a signal filtering process by simultaneously using two first input capacitors and one second input capacitor. Moreover, in case of the rated voltage of the input AC power being in a range between 110 Vac and 264 Vac, the switch element is controlled to complete a switch-OFF operation, so as to make the input-end filtering unit execute the signal filtering process by merely using two first input capacitors.

12 Claims, 10 Drawing Sheets

FAST CHARGING DEVICE FOR MOBILE ELECTRONIC DEVICE

BACKGROUND OF THE INVENTION

1. Field of the Invention

The present invention relates to the technology field of charger, and more particularly to a fast charging device for mobile electronic device.

2. Description of the Prior Art

With advanced development of mobile electronic devices, laptop computer, tablet computer, smartphone, smart watch, and Bluetooth headset have hence become necessary articles for modern people. Moreover, due to the fact that the use time of mobile electronic product such as smartphone spent by a normal user is found to be getting longer, how to enhance the charging efficiency of the mobile electronic product for extending the battery endurance of the mobile electronic product has therefore become the most important issue. Nowadays, some fast charging solutions have been applied in chargers of various mobile electronic products. The forgoing fast charging solutions include Quick Charge (QC) technique proposed by Qualcomm incorporated and USB Power Delivery technique defined by USB Implementers Forum.

FIG. 1 illustrates a stereo diagram of a conventional fast charger device. As FIG. 1 shows, the fast charger device 1' has a first fast-charging connector 11' that meets the fast-charging standards and a power connector 12' for being coupled to an AC power. It is easily understood that, after making a first electrical connector 31' and a second electrical connector 32' of a fast-charging electrical cable 3' be respectively connected to the fast-charging connector 11' of the fast charger device 1' and a second fast-charging connector 21' of a smartphone 2', the smartphone 2' is charged fastly by the fast charger device 1'.

FIG. 2 depicts a stereo diagram of a circuit board structure of the conventional fast charger device, and FIG. 3 illustrates a circuit topology diagram of the conventional fast charger device. From FIG. 2 and FIG. 3, it is known that the conventional fast charger device 1' comprises: a circuit board 10', a first fast-charging connector 11', a power connector 12', a bridge rectifier unit 13', a first CLC filter unit 14' consisting of at least one choke coil Lin' and a plurality of input capacitors Cin', a flyback transformer 15' consisting of a primary winding 15P', a secondary winding 15S' and an auxiliary winding 15A', a rectifier and filter unit 16' consisting of a rectifying diode 16D' and a filtering capacitor 16C', a second CLC filter unit 17', a voltage detection unit 18', an optical coupler 19' consisting of an LED element LD' and a phototransistor LT', a control unit 1FC', and a switch element 1SW'.

It is well known that, mains electricity is the general-purpose alternating-current (AC) electric power supply. Moreover, mains electricity by country includes a list of countries and territories, with the plugs, voltages and frequencies they commonly use for achieving electrical power supplying. For example, in Mainland China, Hong Kong and Macau, the common power voltage is 220 Volt 50 Hz AC, but in Taiwan, electronic devices often work with the electricity supply voltage of 110V/60 HZ. On the other hand, in most of Africa countries, the common power voltage is between 220 and 240 volts (50 or 60 Hz), but in Japan, electronic devices often work with the electricity supply voltage of 100V/50 HZ. For above reason, the conventional fast charger device 1' is designed to be capable of receiving an input AC power with full-range input voltage that is in a range between 90 Vac and 264 Vac. The input voltage range of 90-264 Vac is defined by 100 Vac−(100 Vac×10%) and 240 Vac+(240 Vac×10%). Thus, when designing a non-PFC-type fast charger device 1' capable of receiving an input AC power with full-range input voltage, the first CLC filter unit 14' needs to be particularly designed in order to largely reduce the ripples occurring on a voltage signal that is outputted from the bridge rectifier unit 13', thereby guaranteeing a voltage value of a HV+ terminal of the non-PFC-type fast charger device 1' that is measured at a highest input AC power and a lowest input AC power is 264 Vdc and 90 Vdc, respectively. Therefore, breakdown voltage of the input capacitor Cin' needs to reach $264 \times \sqrt{2} = 373.3$ Vmax. In such case, a 400V (or 450V) aluminum electrolytic capacitor is the best choice for being as the forgoing input capacitor Cin'. In addition, the aluminum electrolytic capacitor has a capacitance of Pout×2±10%. For example, in case of the fast charger device 1' has a Pout of 65 W, the aluminum electrolytic capacitor with capacitance of 130 μF and breakdown voltage of 400V is adopted for being as the input capacitor Cin' of the first CLC filter 14'.

Therefore, in order to make the fast charger device 1' capable of receiving an input AC power with full-range input voltage be able to exhibit an outstanding charging performance, a total input capacitance of the first CLC filter unit 14' needs to be further increased under the same volume of the circuit structure of the fast charger device 1' or the volume of the circuit structure of the fast charger device 1' is designed to smaller than before. As explained in more detail below, when letting the first CLC filter unit 14' consists of four 33 μF/40 VDC/10 mm aluminum electrolytic capacitors (i.e., four input capacitors Cin'), the circuit board 10' of the fast charger device 1' must has a board width of 10×4=40 mm for making a small spacing exist between any two of the input capacitors Cin', however, the commercial fast charger device's is really designed to have a 46 nm board width. As such, a voltage value of a HV+ terminal of the non-PFC-type fast charger device 1' that is measured at a highest input AC power and a lowest input AC power is guaranteed to be 264 Vdc and 90 Vdc, respectively. However, it is a pity that letting the first CLC filter unit 14' consists of four 33 μF/40 VDC/10 mm aluminum electrolytic capacitors also exhibits many drawbacks in practical use of the fast charger device 1'.

FIG. 4 shows a timing diagram of a voltage signal. As graph (a) of FIG. 4 and FIG. 3 show, the bridge rectifier unit 13' outputs a pulsating DC voltage signal u after receiving a 50 Hz AC power signal. Subsequently, as graph (b) of FIG. 4 shows, the pulsating DC voltage signal u is transmitted to the first CLC filter unit 14', and then is converted to a DC voltage signal U. In an ideal case, the higher the total capacitance that the first CLC filter unit 14' has, the smaller rippers that the DC voltage signal U carries. However, in a real case, the best way to largely eliminate the rippers occurring on the DC voltage signal U is to calculate a most suitable total capacitance of the first CLC filter unit 14'. As explained in more detail below, in case of the input capacitors being designed to have a lower capacitance, a minimum voltage value of the DC voltage signal U may be too low. On the other hand, it causes a capacitor using cost be too high in case of the input capacitors being designed to have an exceeding capacitance.

In other words, the best way is to select a proper capacitance of each of the input capacitors Cin' according to high (220 Vac) and low (110 Vac) of a rated voltage of the AC power signal. However, it is understood that, a usage amount of the input capacitors Cin' of the conventional fast charger device 4' is fixed to four, causing that a total capacitance of the first CLC filter 14' fails to be adaptively changed according to high and low of the rated voltage of the AC power signal. On the other hand, above descriptions have indicated that, letting the first CLC filter unit 14' consists of four 33 μF/40 VDC/10 mm aluminum electrolytic capacitors exhibits one drawback of the circuit board 10' of the fast charger device 1' must having a board width of 10×4=40 mm, causing that the whole volume of the fast charger device 1' is difficult to be further shrunk.

From above descriptions, it is clear that there is still room for improvement in the conventional fast charger device 1'. In view of that, inventors of the present application have made great efforts to make inventive research and eventually provided a fast charging device for mobile electronic device.

SUMMARY OF THE INVENTION

The primary objective of the present invention is to disclose a fast charging device for mobile electronic device, comprising: a bridge rectifier unit, an input-end filtering unit, a voltage conversion unit, a switch unit, a rectifier and filter unit, an output-end filtering unit, a voltage detection unit, a control unit, and an optical coupler. In the present invention, the input-end filtering unit is particularly designed to comprise two first input capacitors, one second input capacitor, and one switch element. The first input capacitor has a first capacitance, and the second input capacitor has a second capacitance that is smaller than the first capacitance. By such design, in case of a rated voltage of an AC power signal being smaller than 110 Vac, the control unit controls the switch element to complete a switch-ON operation, so as to make the input-end filtering unit execute a signal filtering process by simultaneously using two first input capacitors and one second input capacitor. Moreover, in case of the rated voltage of the AC power signal being in a range between 110 Vac and 264 Vac, the control unit controls the switch element to complete a switch-OFF operation, so as to make the input-end filtering unit execute the signal filtering process by merely using two first input capacitors.

By such design, a usage amount of the aluminum electrolytic capacitors contained in the input-end filtering unit is up to three, thereby allowing a board width of a circuit board of this novel fast charging device to be further shrunk. As a result, the fast charging device has a shrunk volume that is smaller than the conventional fast charger's volume.

In order to achieve the primary objective of the present invention, inventors of the present invention provides one embodiment of the fast charging device for mobile electronic device, having an AC power coupling interface and at least one device connector for being connected to at least one mobile electronic device; wherein the device connector meets a first fast charge standard of quick charge (QC) and/or a second fast charge standard of USB power delivery (USB PD), and the fast charging device comprises:
- a bridge rectifier unit, being coupled to the AC power coupling interface and a first ground end, and being used for converting an AC power signal received from the AC power coupling interface to a pulsating DC voltage signal;
- an input-end filtering unit, being coupled to the bridge rectifier unit and the first ground end, and being used for converting the pulsating DC voltage signal received from the bridge rectifier unit to a DC voltage signal;
- a transformer unit, comprising a primary winding having a first electrical terminal and a second electrical terminal, a secondary winding having a first electrical terminal and a second electrical terminal, and an auxiliary winding having a first electrical terminal and a second electrical terminal, wherein the first electrical terminal of the primary winding is coupled to the input-end filtering unit;
- a switch unit, having a first terminal coupled to the second electrical terminal of the secondary winding, a second terminal coupled to the first ground end, and a third terminal;
- a rectifier and filter unit, being coupled to the first electrical terminal of the secondary winding and a second ground end, wherein the second electrical terminal of the secondary winding is also coupled to the second ground end;
- an output-end filtering unit, being coupled to the first electrical terminal of the secondary winding, the second ground end and a power outputting end that is coupled to the device connector;
- a voltage detection unit, being coupled between the power outputting end and the second ground end;
- a control unit, being coupled to the third terminal of the switch unit, and the auxiliary winding being coupled to the control unit and the first ground end by the first electrical terminal and the second electrical terminal thereof; and
- an optical coupler, being coupled between a signal transmitting terminal of the voltage detection unit, the second ground end, the first ground end, and the control unit;

wherein the input-end filtering unit comprises:
- two first input capacitors, wherein each of the two first input capacitors has a first capacitance, and being coupled to the pulsating DC voltage signal transmitted by the bridge rectifier unit and the first ground end by a first end and a second end thereof;
- a second input capacitor, having a second capacitance that is greater than the first capacitance, and being coupled to the pulsating DC voltage signal transmitted by the bridge rectifier unit and the first ground end by a first end and a second end thereof; and
- a switch element, having a first terminal coupled to the second end of the second input capacitor, a second terminal coupled to the first ground end, and a third terminal coupled to the control unit;

wherein in case of a rated voltage of the AC power signal being smaller than 110 Vac, the control unit controls the switch element to complete a switch-ON operation, so as to make a signal channel be formed in the switch element, thereby making the second end of the second input capacitor be coupled to the first ground end via the signal channel, such that the input-end filtering unit executes a signal filtering process by simultaneously using the two first input capacitors and the second input capacitor;

wherein in case of the rated voltage of the AC power signal being in a range between 110 Vac and 264 Vac, the control unit controls the switch element to complete a switch-OFF operation so as to cut off the signal channel, thereby making the input-end filtering unit execute the signal filtering process by merely using two first input capacitors.

In one embodiment, the forgoing device connector is selected from the group consisting of USB electrical connector meeting the second fast charge standard of USB power delivery (USB PD), type-C USB electrical connector and Thunderbolt 3 electrical connector.

In one embodiment, the forgoing the optical coupler comprises:
- an LED element, being coupled to the signal transmitting terminal of the voltage detection unit and the second ground end by an anode terminal and a cathode terminal thereof; and
- a phototransistor, having a base terminal, an emitter terminal and a collector terminal coupled to the control unit, and receiving a light signal transmitted by the LED element by the base terminal.

In one embodiment, the forgoing output-end filtering unit is a π filter.

In one embodiment, the forgoing input-end filtering unit also includes a choke coil that is coupled between the two first input capacitors, such that the input-end filtering unit is a π filter.

In one embodiment, the forgoing fast charging device further comprises a Y capacitor that is coupled to the second ground end and the first ground end by a first end and a second end thereof.

In one embodiment, the forgoing fast charging device further comprises:
- a Soft start rectifier unit, being coupled between the first electrical terminal of the primary winding, the second electrical terminal of the auxiliary winding, and the control unit; and
- a DC voltage sensing unit, having a first terminal coupled to the first electrical terminal of the primary winding and a second terminal coupled to the control unit, such that the control unit is able to monitor a voltage level of the DC voltage signal through the DC voltage sensing unit.

In one embodiment, the forgoing fast charging device further comprises:
- a temperature protection unit, being coupled between the Soft start rectifier unit, the first ground end and the control unit, and comprising a thermistor and a BJT element;
- a current sensing unit, having a first terminal coupled to the second terminal of the switch unit and a second terminal coupled to the control unit, such that the control unit is able to monitor a current level of the DC voltage signal through the current sensing unit; and
- a voltage clamping unit, being coupled between the first electrical terminal of the primary winding, the first electrical terminal of the secondary winding, and the second terminal of the switch unit, and comprising a resistor, a capacitor and a diode.

In one embodiment, the forgoing fast charging device further comprises a circuit board, such that the AC power coupling interface, the device connector, the bridge rectifier unit, the input-end filtering unit, the transformer unit, the switch unit, the rectifier and filter unit, the output-end filtering unit, the voltage detection unit, the control unit, the optical coupler, the Soft start rectifier unit, the DC voltage sensing unit, the temperature protection unit, the current sensing unit, and the a voltage clamping unit are disposed on a front surface and/or a rear surface of the circuit board. Moreover, the circuit board is accommodated in a housing.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a fast charging device for mobile electronic device disclosed by the present invention, embodiments of the present invention will be described in detail with reference to the attached drawings hereinafter.

First Embodiment

Figure 5A:
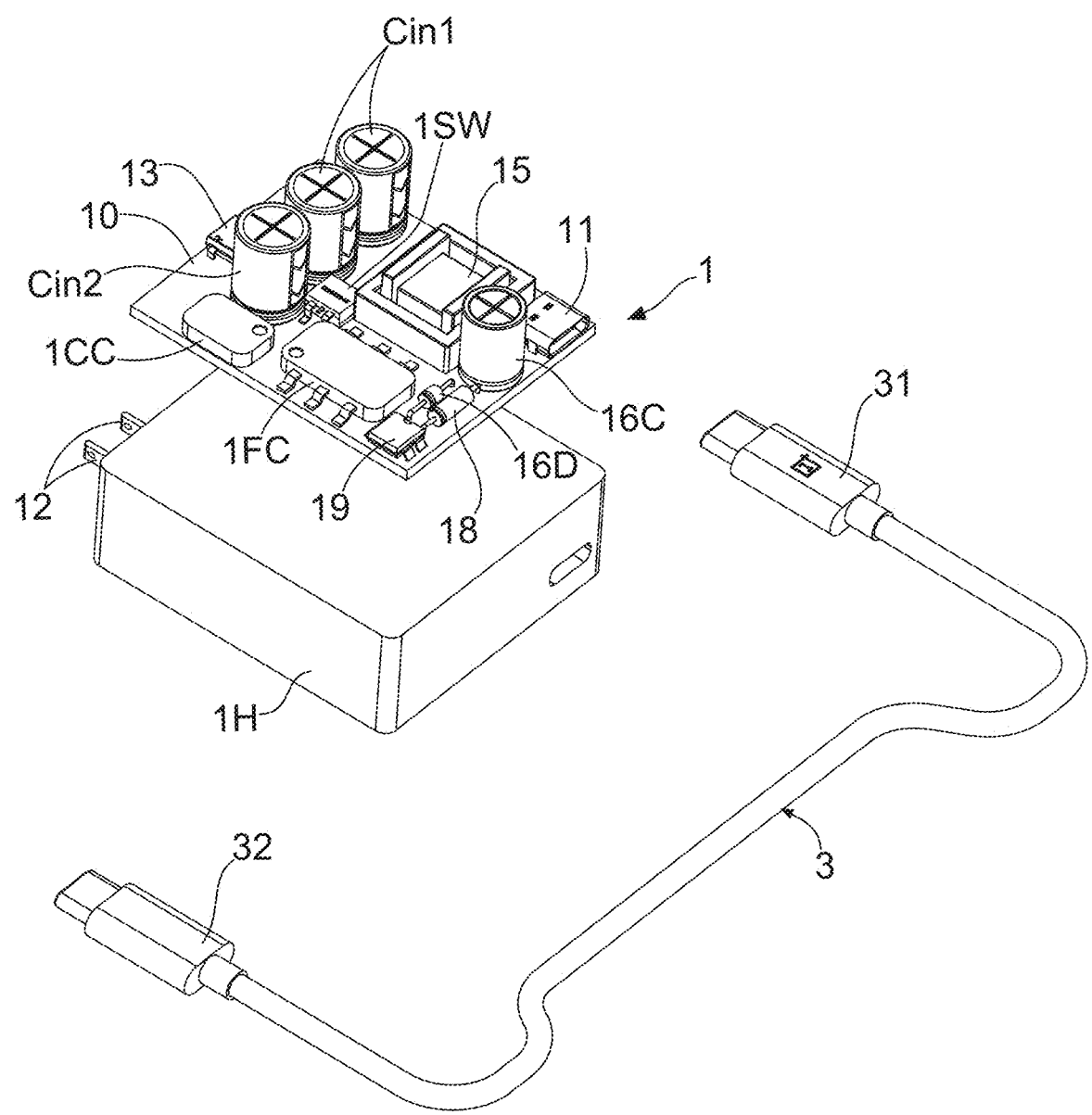
FIG. 5A shows a first stereo diagram of a fast charging device for mobile electronic device according to the present invention.
Figure 5B:
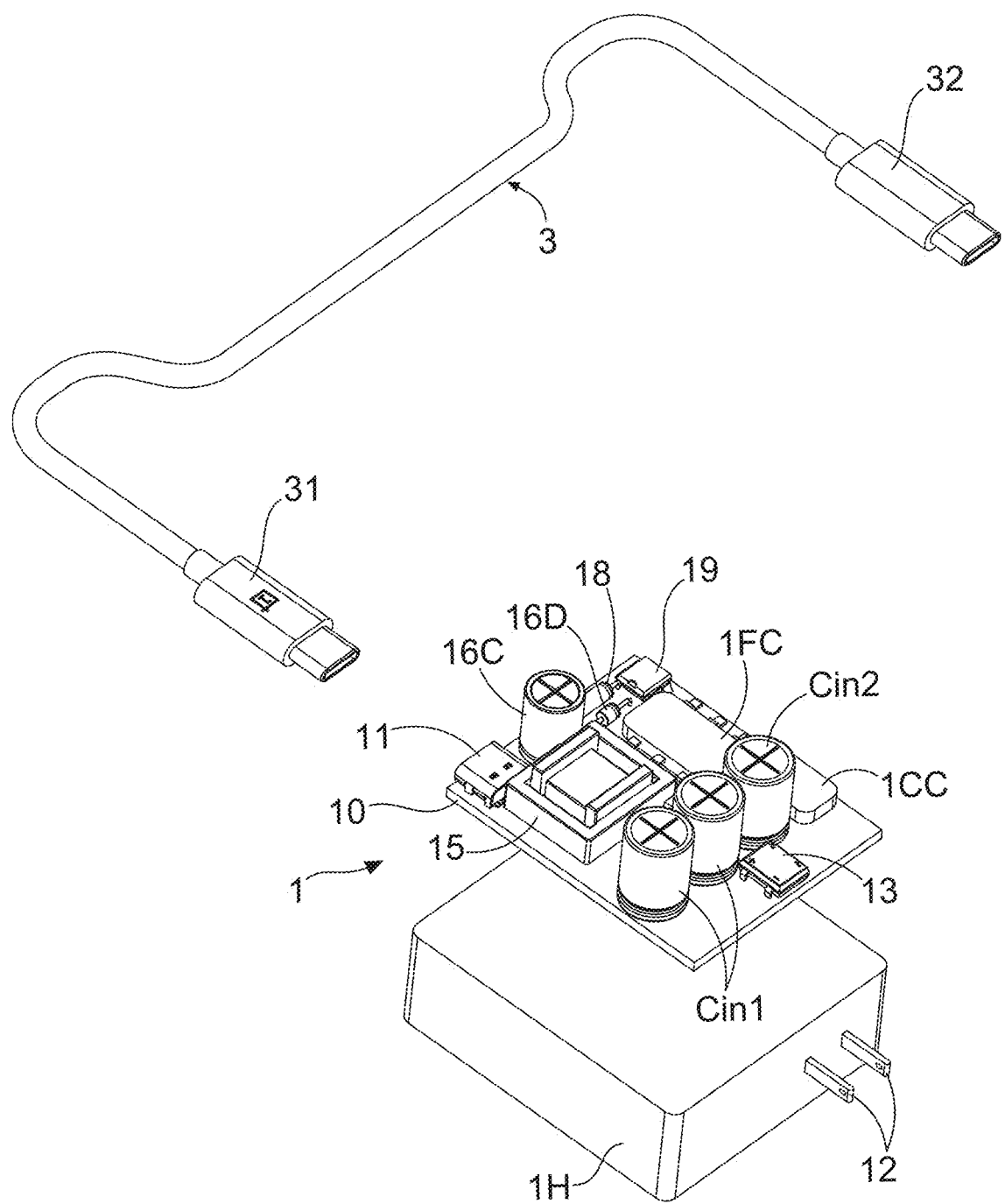
FIG. 5B shows a second stereo diagram of a fast charging device for mobile electronic device according to the present invention.
Figure 6:
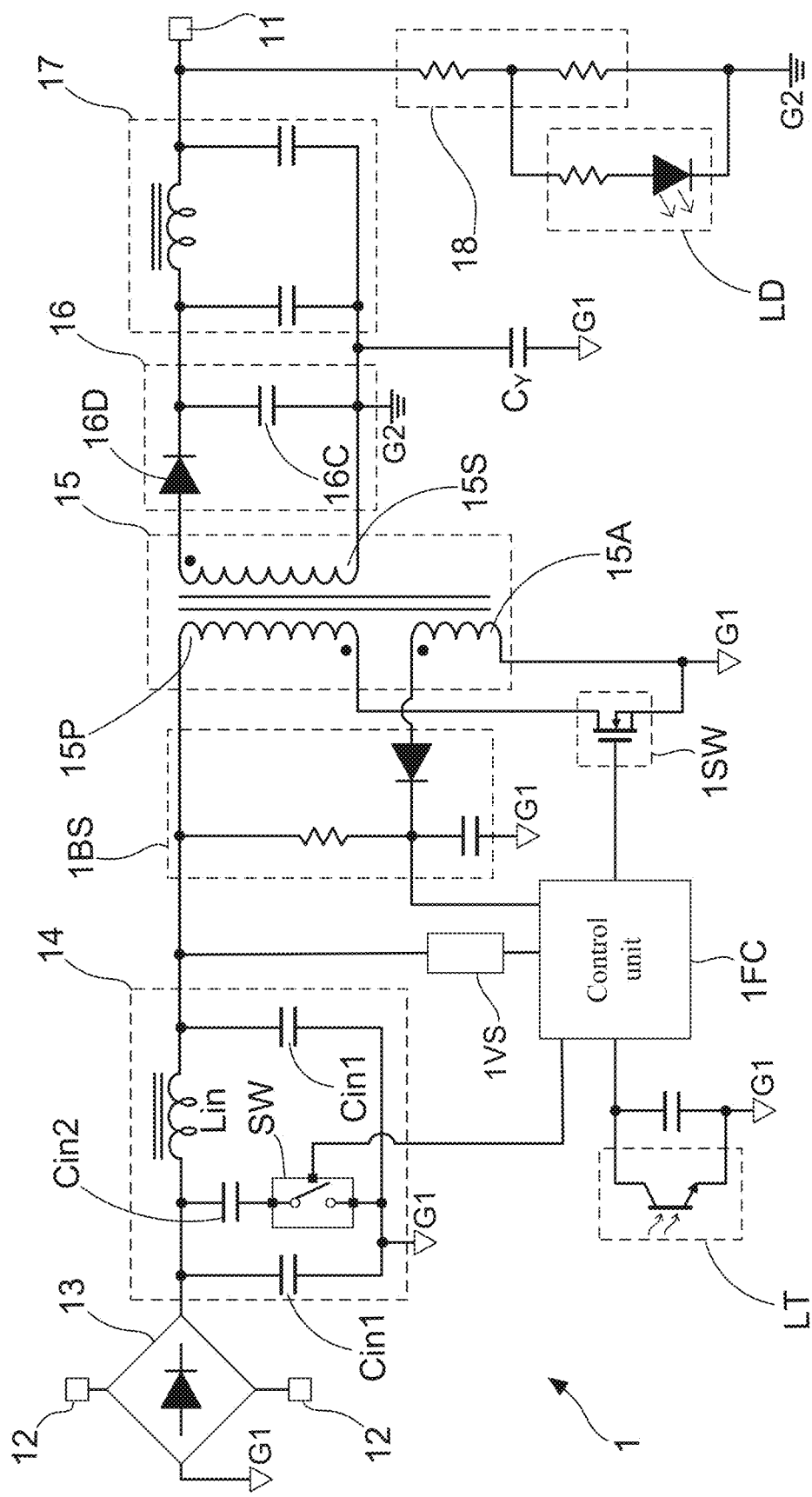
FIG. 6 shows a first circuit topology diagram of the fast charging device for mobile electronic device according to the present invention.

With reference to FIG. 5A, there is shown a first stereo diagram of a fast charging device for mobile electronic device according to the present invention. Moreover, FIG. 5B illustrates a second stereo diagram of the fast charging device for mobile electronic device. In addition, FIG. 6 shows a first circuit topology diagram of the fast charging device for mobile electronic device. In the present invention, a fast charging device 1 is disclosed, which has an AC power coupling interface 12 and at least one device connector 11 for being connected to at least one mobile electronic device 2. Herein, it is worth explaining that, the device connector 11 meets a first fast charge standard of quick charge (QC) and/or a second fast charge standard of USB power delivery (USB PD). As such, the device connector 11 can be a USB electrical connector meeting the second fast charge standard of USB power delivery (USB PD), a type-C USB electrical connector or a Thunderbolt 3 electrical connector.

It is easily understood that, after making a first electrical connector 31 and a second electrical connector 32 of a fast-charging electrical cable 3 be respectively connected to the device connector 11 of the fast charging device 1 and a charger connector 21 of an mobile electronic device 2 like a smartphone, the smartphone is charged fastly by the fast charging device 1 of the present invention. Of course, the mobile electronic device 2 is not limited to be smartphone. In one practicable embodiment, the mobile electronic device 2 can also be a portable Li-ion battery, a wireless charging pad, a laptop computer, a tablet computer, or a Bluetooth headset.

From FIG. 5A, FIG. 5B and FIG. 6, it is known that the fast charging device 1 of the present invention principally comprises: a circuit board 10, an AC power coupling interface 12, a device connector 11, a bridge rectifier unit 13, an input-end filtering unit 14, a transformer unit 15, a rectifier and filter unit 16, an output-end filtering unit 17, a voltage detection unit 18, a control unit 1FC, an optical coupler 19, and a switch unit 1SW. The bridge rectifier unit 13 is coupled to the AC power coupling interface 12 and a first ground end G1, and is used for converting an AC power signal received from the AC power coupling interface 12 to a pulsating DC voltage signal (u). Moreover, the input-end filtering unit 14 is coupled to the bridge rectifier unit 13 and the first ground end G1, and is used for converting the pulsating DC voltage signal (u) received from the bridge rectifier unit 13 to a DC voltage signal (U).

As explained in more detail below, the transformer unit 15 comprises a primary winding 15P having a first electrical terminal and a second electrical terminal, a secondary winding 15S having a first electrical terminal and a second electrical terminal, and an auxiliary winding 15A having a first electrical terminal and a second electrical terminal. From FIG. 6, it is known that the first electrical terminal of the primary winding 15P is coupled to the input-end filtering unit 14. On the other hand, the switch unit (i.e., power MOSFET elemtn) 1SW having a first (drain) terminal coupled to the second electrical terminal of the secondary winding 15S, a second (source) terminal coupled to the first ground end, and a third terminal. Moreover, the rectifier and filter unit 16 is coupled to the first electrical terminal of the secondary winding 15S and a second ground end G2. FIG. 6 also depicts that the second electrical terminal of the secondary winding 15S is also coupled to the second ground end G2. In addition, the output-end filtering unit 14 is coupled to the first electrical terminal of the secondary winding 15S, the second ground end and a power outputting end that is coupled to the device connector 11.

In the present invention, as FIG. 6 shows, the voltage detection unit 18 is coupled between the power outputting end and the second ground end G2, the control unit 1FC is coupled to the third (gate) terminal of the switch unit 1SW, and the auxiliary winding 15A is coupled to the control unit 1FC and the first ground end G1 by the first electrical terminal and the second electrical terminal thereof. On the other hand, the optical coupler 19 is coupled between a signal transmitting terminal of the voltage detection unit 18, the second ground end G2, the first ground end G1, and the control unit 1FC. Electronic engineers certainly know that the optical coupler 19 is commonly an electronic component that integrated with an LED element LD and a phototransistor LT therein. In which, the LED element is coupled to the signal transmitting terminal of the voltage detection unit 18 and the second ground end by an anode terminal and a cathode terminal thereof. Moreover, the phototransistor lt has a base terminal, an emitter terminal and a collector terminal coupled to the control unit, and receives a light signal transmitted by the LED element LD by the base terminal thereof.

Particularly, the present invention lets the input-end filtering unit 14 comprise a switch element SW, a choke coil Lin, two first input capacitors Cin1 and a second input capacitor Cin2. From FIG. 6, it is understood that each of the two first input capacitors Cin1 has a first capacitance, and is coupled to the pulsating DC voltage signal (u) transmitted by the bridge rectifier unit 13 and the first ground end G1 by a first end and a second end thereof. On the other hand, the second input capacitor Cin2 has a second capacitance that is greater than the first capacitance, and is coupled to the pulsating DC voltage signal (u) transmitted by the bridge rectifier unit 13 and the first ground end G1 by a first end and a second end thereof. It is worth noting that, the switch element SW has a first terminal coupled to the second end of the second input capacitor Cin2, a second terminal coupled to the first ground end G1, and a third terminal coupled to the control unit 1FC.

For example, two 27 μF/400 VDC/12.5 mm aluminum electrolytic capacitors are adopted for being as the two first input capacitors Cin1, and one aluminum electrolytic capacitor with capacitor parameters of 68 μF/160 VDC/8 mm, 68 μF/160 VDC/10 m, 68 μF/160 VDC/12.5 mm, or 68 μF/160 VDC/16 mm can be adopted for being as the second input capacitors Cin2. By such arrangement, a usage amount of the aluminum electrolytic capacitors contained in the input-end filtering unit 14 is up to three, thereby allowing a board width of a circuit board 10 of this novel fast charging device 1 to be in a range between (12.5×2)+8=33 mm and (12.5×2)+16=41 mm. Briefly speaking, letting the input-end filtering unit 14 comprise a switch element SW, a choke coil Lin, two first input capacitors Cin1 and a second input capacitor Cin2 make a usage amount of the aluminum electrolytic capacitors contained in the input-end filtering unit 14 be up to three, thereby allowing the circuit board's 10 board width to be further shrunk. As a result, the fast charging device 1 has a shrunk volume that is smaller than the conventional fast charger's volume.

As FIG. 6 shows, the input-end filtering unit 14 also includes a choke coil Lin that is coupled between the two first input capacitors Cin1, such that the input-end filtering unit 14 is a π filter (i.e., CLC filter). Moreover, the output-end filtering unit 17 is also a π filter. In one embodiment, the rectifier and filter unit 16 comprises a diode 16D and a filtering capacitor 16C, wherein the diode 16D is coupled to the first electrical terminal of the secondary winding 15S by an anode terminal thereof, and the filtering capacitor 16C is coupled to a cathode terminal of the diode 16D and the second ground g2 end by a first end and a second end thereof. Herein, it needs further explain that, the rectifier and filter unit 16 can also be designed to comprise a synchronous rectification element (not shown) and the filtering capacitor in other practicable embodiment. In such case, the synchronous rectification element having a first (drain) terminal coupled to the first electrical terminal of the secondary winding 15S, a second (source) terminal coupled to the power outputting end, and a third (gate) terminal coupled to the control unit 1FC.

Figure 1:
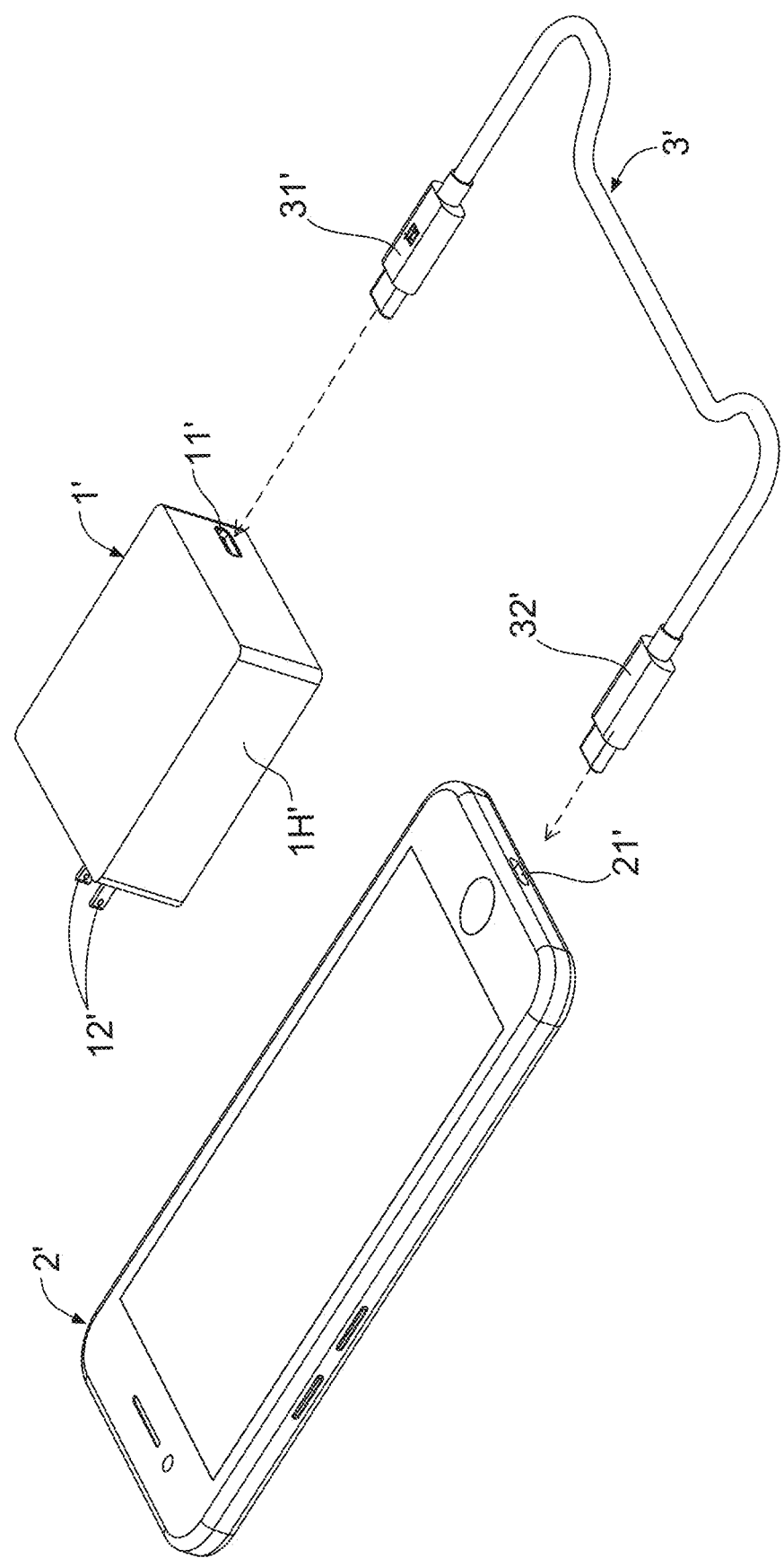
FIG. 1 shows a stereo diagram of a conventional fast charger device.
Figure 2:
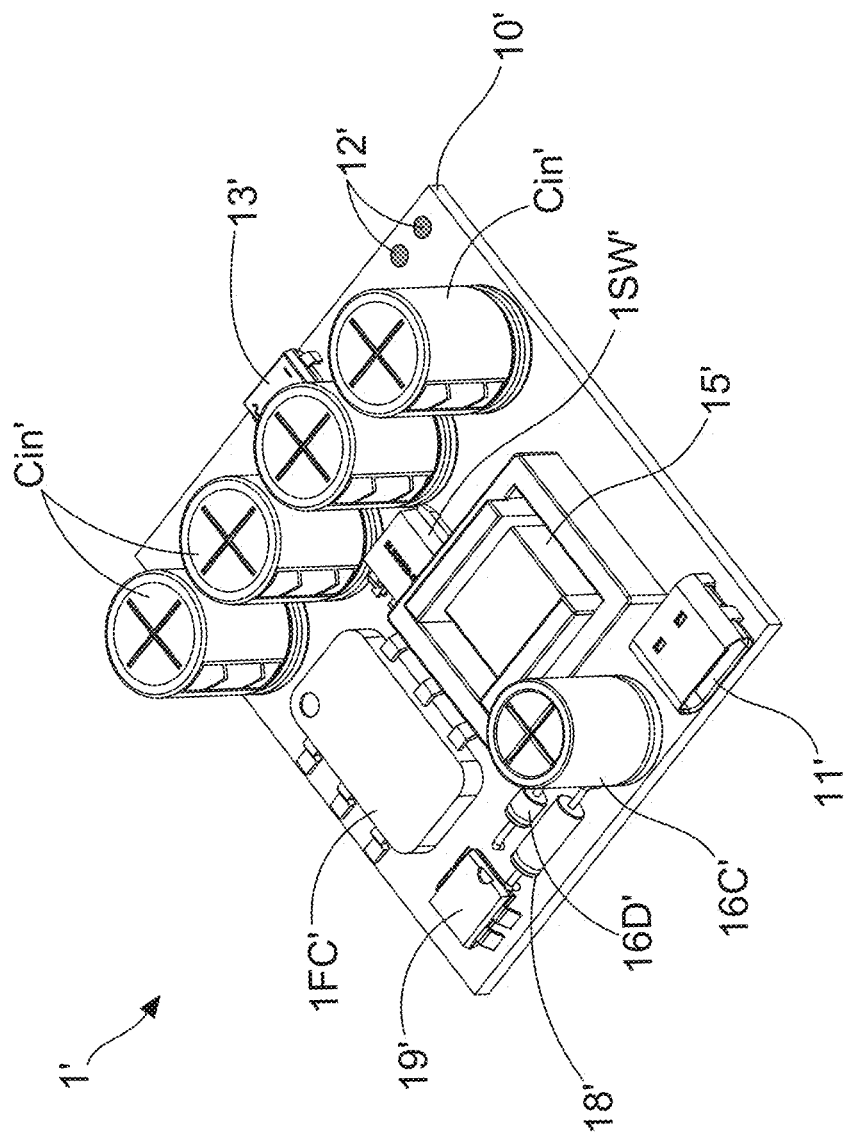
FIG. 2 shows a stereo diagram of a circuit board structure of the conventional fast charger device.
Figure 3:
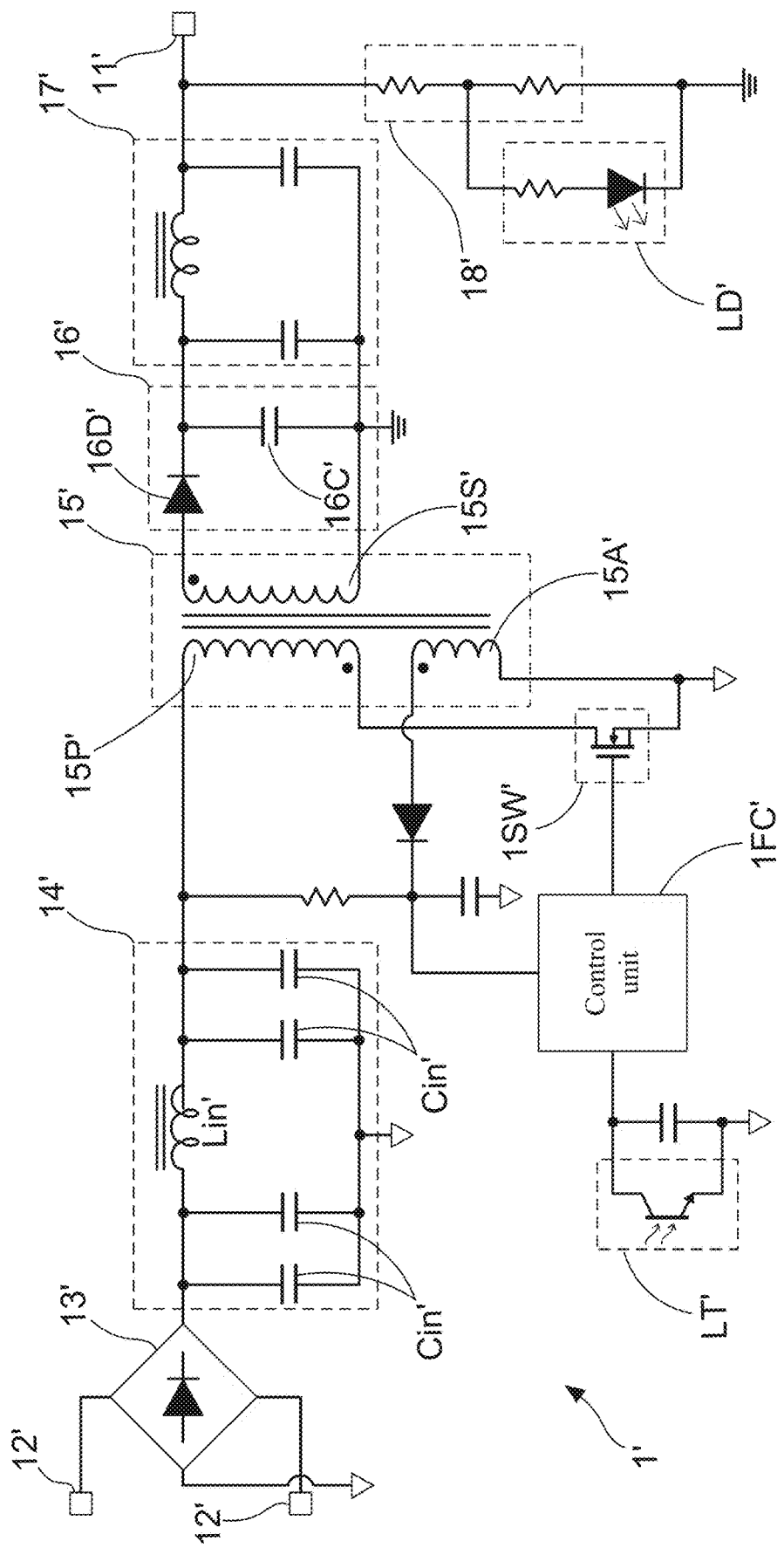
FIG. 3 shows a circuit topology diagram of the conventional fast charger device.
Figure 4:
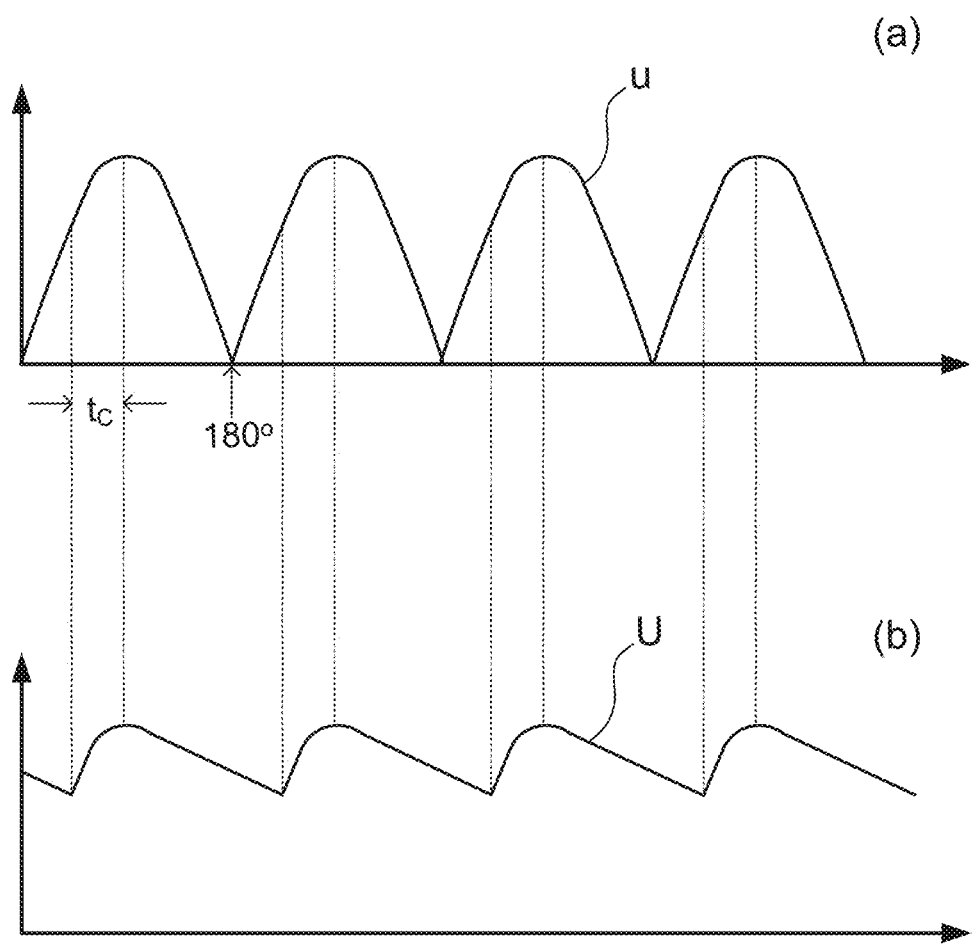
FIG. 4 shows a timing diagram of a voltage signal.

As FIG. 4 shows, in an ideal case, the higher the total capacitance that the input-end filter unit 14 has, the smaller rippers that the DC voltage signal U carries. However, in a real case, the best way to largely eliminate the rippers occurring on the DC voltage signal U is to calculate a most suitable total capacitance of the input-end filter unit 14. For above reasons, the present invention particularly lets the input-end filtering unit 14 comprise a switch element SW, a choke coil Lin, two first input capacitors Cin1 and a second input capacitor Cin2, wherein the first input capacitor Cin1 has properties of relative-low capacitance (27 μF) and high breakdown voltage (400 VDC), and the second input capacitor Cin2 has properties of relative-high capacitance (38 μF) and low breakdown voltage (160 VDC).

By such special design, in case of a rated voltage of the AC power signal being smaller than 110 Vac, the control unit 1FC controls the switch element SW to complete a switch-ON operation, so as to make a signal channel be formed in the switch element SW, thereby making the second end of the second input capacitor Cin2 be coupled to the first ground end G1 via the signal channel, such that the input-end filtering unit 14 executes a signal filtering process by simultaneously using the two first input capacitors Cin1 and the second input capacitor Cin2. In such case, a total (equivalent) capacitance of the input-end filtering unit 14 can be calculated to 27 μF+27 μF+68 μF=122 μF. Moreover, in case of the rated voltage of the AC power signal being in a range between 110 Vac and 264 Vac, the control unit 1FC controls the switch element SW to complete a switch-OFF operation so as to cut off the signal channel, thereby making the input-end filtering unit 14 execute the signal filtering process by merely using two first input capacitors Cin1. In such case, a total (equivalent) capacitance of the input-end filtering unit 14 can be calculated to 27 μF+27 μF=54 μF.

From FIG. 6, it is further found that, the fast charging device 1 further comprises a DC voltage sensing unit 1VS, a soft start rectifier unit 1BS, and a Y capacitor $C_Y$. The soft start rectifier unit 1BS is coupled between the first electrical terminal of the primary winding 15P, the second electrical terminal of the auxiliary winding 15A, and the control unit 1FC, and consists of a resistor, a capacitor and a diode. On the other hand, the DC voltage sensing unit 1VS has a first terminal coupled to the first electrical terminal of the primary winding 15P and a second terminal coupled to the control unit 1FC, such that the control unit 1FC is able to monitor a voltage level of the DC voltage signal (U) through the DC voltage sensing unit 1VS. In addition, the Y capacitor $C_Y$ is coupled to the second ground end G2 and the first ground end G1 by a first end and a second end thereof.

FIG. 5A and FIG. 5B also depict that the fast charging device 1 comprises a circuit board 10 and a housing 1H, such that the AC power coupling interface 12, the device connector 11, the bridge rectifier unit 13, the input-end filtering unit 14, the transformer unit 15, the switch unit 1SW, the rectifier and filter unit 16, the output-end filtering unit 17, the voltage detection unit 18, the control unit 1FC, the optical coupler 19, the soft start rectifier unit 1BS, the DC voltage sensing unit 1VS, the temperature protection unit 1TS, the current sensing unit 1CS, and the voltage clamping unit 1VC are disposed on a front surface and/or a rear surface of the circuit board 10. Moreover, the circuit board 10 is accommodated in the housing 1H.

Second Embodiment

Figure 7:
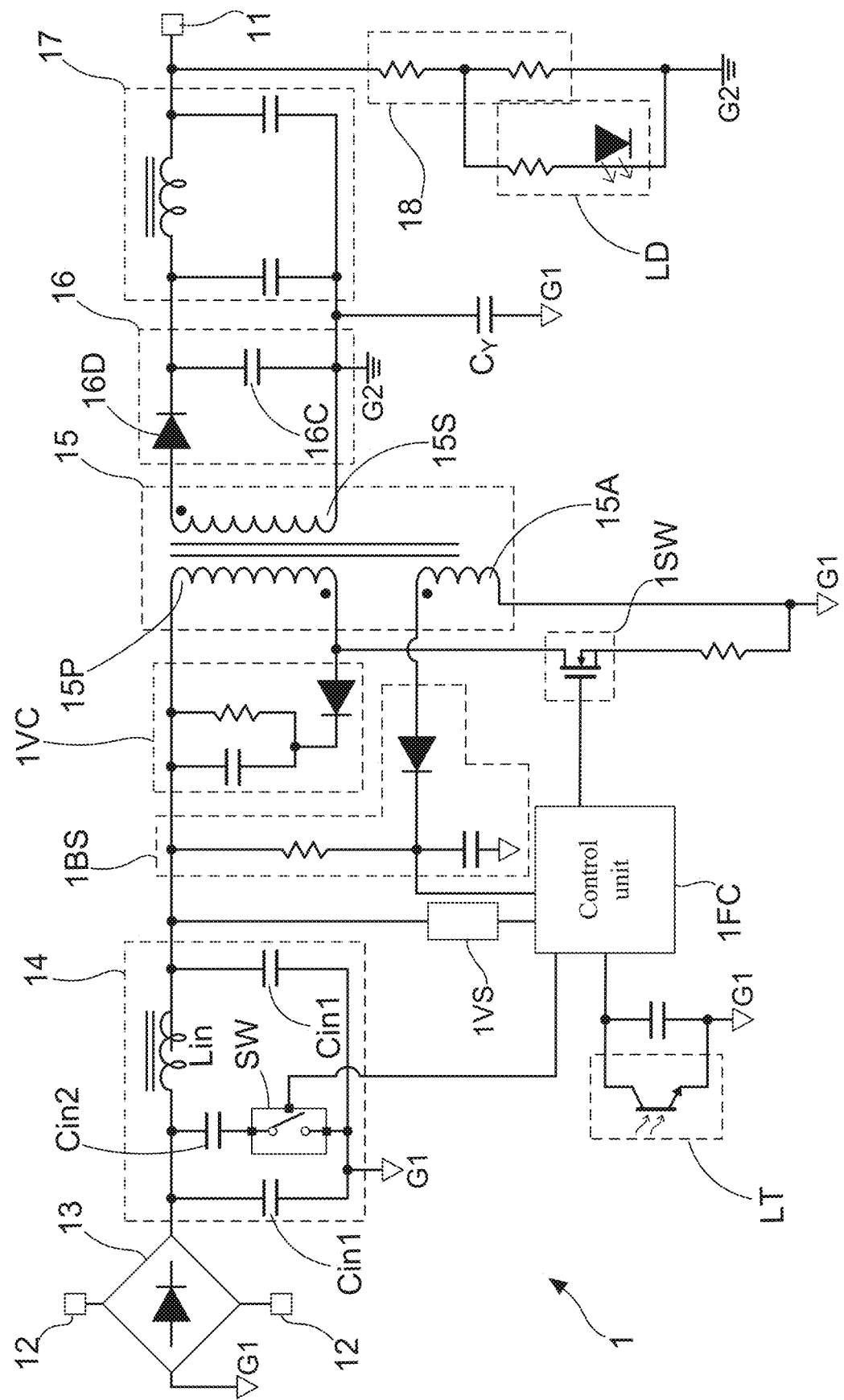
FIG. 7 shows a second circuit topology diagram of the fast charging device for mobile electronic device according to the present invention.

With reference to FIG. 7, there is shown a second circuit topology diagram of the fast charging device for mobile electronic device according to the present invention. After comparing FIG. 7 with FIG. 6, it is easy to find that, second embodiment of the fast charging device 1 further comprises a voltage clamping unit 1VC, which is a RCD circuit comprising a resistor, a capacitor and a diode, and is coupled between the first electrical terminal of the primary winding 15P, the first electrical terminal of the secondary winding 15S, and the second terminal of the switch unit 1SW.

Third Embodiment

Figure 8:
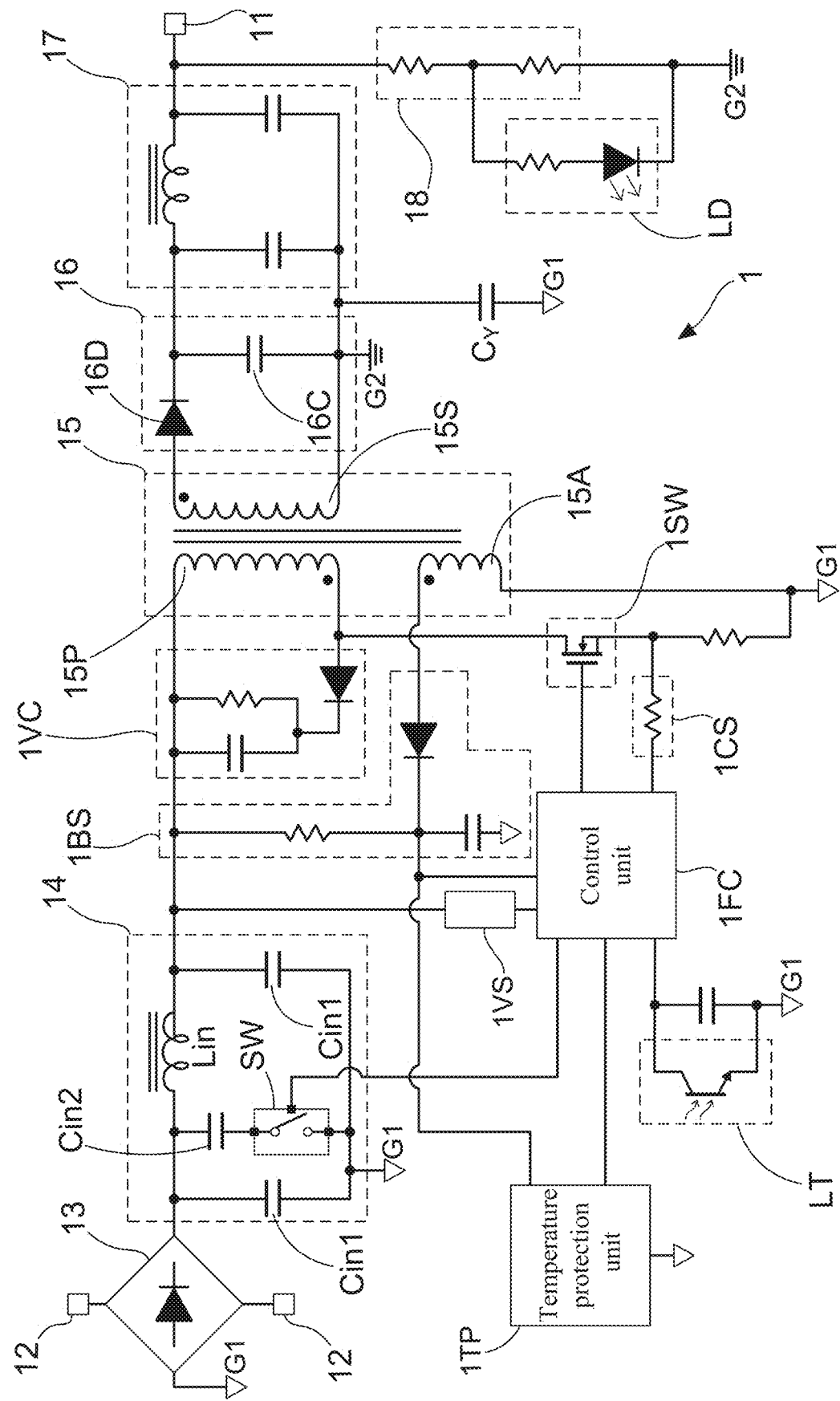
FIG. 8 shows a third circuit topology diagram of the fast charging device for mobile electronic device according to the present invention.

With reference to FIG. 8, there is shown a third circuit topology diagram of the fast charging device for mobile electronic device according to the present invention. After comparing FIG. 8 with FIG. 7, it is easy to find that, third embodiment of the fast charging device 1 further comprises a temperature protection unit 1TS, which comprises a thermistor and a BJT element, and is coupled between the soft start rectifier unit 1BS, the first ground end G1 and the control unit 1FC. In third embodiment, a resistance of the thermistor changes with a variation of a working temperature, so as to change a base current of the BJT element. As a result, by receiving a collector current from the BJT element, the control unit 1FC is able to further calculate a variation value of the working temperature, thereby adaptively adjusting an outputting current of the fast charging device 1.

FIG. 8 also depicts that a current sensing unit 1CS is integrated in the third embodiment of the fast charging device 1. The current sensing unit 1CS has a first terminal coupled to the second (source) terminal of the switch unit 1SW and a second terminal coupled to the control unit 1FC, such that the control unit 1FC is able to monitor a current level of the DC voltage signal (U) through the current sensing unit 1SC. By the use of the current sensing unit 1SC, the fast charging device 1 is provided with a current limiting (protection) functionality.

Fourth Embodiment

Figure 9:
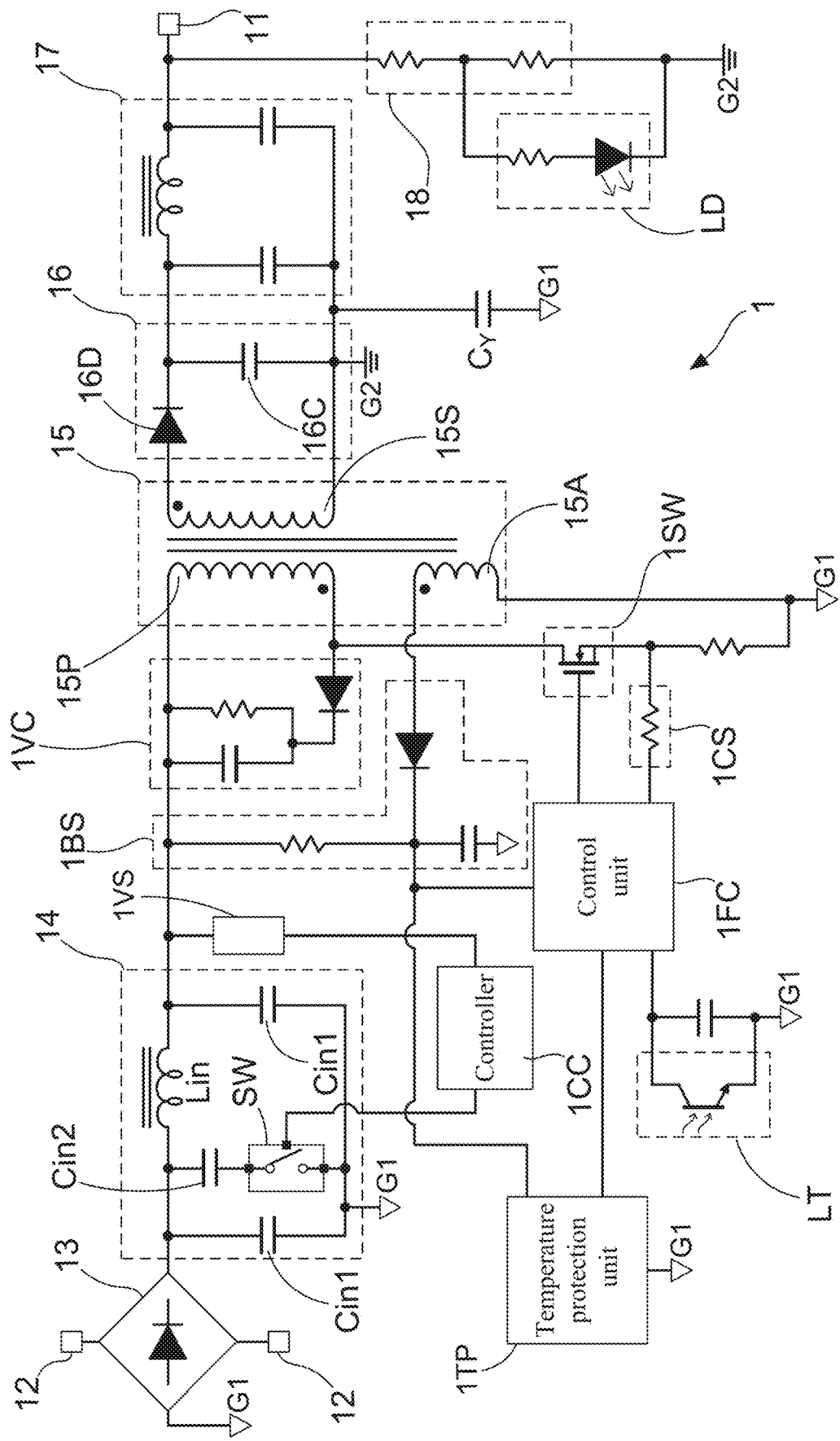
FIG. 9 shows a fourth circuit topology diagram of the fast charging device for mobile electronic device according to the present invention.

With reference to FIG. 9, there is shown a fourth circuit topology diagram of the fast charging device for mobile electronic device according to the present invention. After comparing FIG. 9 with FIG. 8, it is easy to find that, fourth embodiment of the fast charging device 1 further comprises a controller 1CC, which is coupled to a third terminal of the switch element SW and the DC voltage sensing unit 1VS. By such arrangement, the control unit 1FC does not need to be coupled to the DC voltage sensing unit 1VS and the third terminal of the switch element SW. Therefore, in case of a rated voltage of the AC power signal being smaller than 110 Vac, the controller 1CC controls the switch element SW to complete a switch-ON operation, so as to make a signal channel be formed in the switch element SW, thereby making the second end of the second input capacitor Cin2 be coupled to the first ground end G1 via the signal channel, such that the input-end filtering unit 14 executes a signal filtering process by simultaneously using the two first input capacitors Cin1 and the second input capacitor Cin2. In such case, a total (equivalent) capacitance of the input-end filtering unit 14 can be calculated to 27 μF+27 μF+68 μF=122 μF. Moreover, in case of the rated voltage of the AC power signal being in a range between 110 Vac and 264 Vac, the controller 1CC controls the switch element SW to complete a switch-OFF operation so as to cut off the signal channel, thereby making the input-end filtering unit 14 execute the signal filtering process by merely using two first input capacitors Cin1. In such case, a total (equivalent) capacitance of the input-end filtering unit 14 can be calculated to 27 μF+27 μF=54 μF.

The above description is made on embodiments of the present invention. However, the embodiments are not intended to limit scope of the present invention, and all equivalent implementations or alterations within the spirit of the present invention still fall within the scope of the present invention.

What is claimed is:

1. A fast charging device, having an AC power coupling interface and at least one device connector for being connected to at least one mobile electronic device; wherein the device connector meets a first fast charge standard of quick charge (QC) and/or a second fast charge standard of USB power delivery (USB PD), and the fast charging device comprises:

a bridge rectifier unit, being coupled to the AC power coupling interface and a first ground end, and being used for converting an AC power signal received from the AC power coupling interface to a pulsating DC voltage signal;

an input-end filtering unit, being coupled to the bridge rectifier unit and the first ground end, and being used for converting the pulsating DC voltage signal received from the bridge rectifier unit to a DC voltage signal;

a transformer unit, comprising a primary winding having a first electrical terminal and a second electrical terminal, a secondary winding having a first electrical terminal and a second electrical terminal, and an auxiliary winding having a first electrical terminal and a second electrical terminal, wherein the first electrical terminal of the primary winding is coupled to the input-end filtering unit;

a switch unit, having a first terminal coupled to the second electrical terminal of the secondary winding, a second terminal coupled to the first ground end, and a third terminal;

a rectifier and filter unit, being coupled to the first electrical terminal of the secondary winding and a second ground end, wherein the second electrical terminal of the secondary winding is also coupled to the second ground end;

an output-end filtering unit, being coupled to the first electrical terminal of the secondary winding, the second ground end and a power outputting end that is coupled to the device connector;

a voltage detection unit, being coupled between the power outputting end and the second ground end;

a control unit, being coupled to the third terminal of the switch unit, and the auxiliary winding being coupled to the control unit and the first ground end by the first electrical terminal and the second electrical terminal thereof; and an optical coupler, being coupled between a signal transmitting terminal of the voltage detection unit, the second ground end, the first ground end, and the control unit;

wherein the input-end filtering unit comprises:

two first input capacitors, wherein each of the two first input capacitors has a first capacitance, and being coupled to the pulsating DC voltage signal transmitted by the bridge rectifier unit and the first ground end by a first end and a second end thereof;

a second input capacitor, having a second capacitance that is greater than the first capacitance, and being coupled to the pulsating DC voltage signal transmitted by the bridge rectifier unit and the first ground end by a first end and a second end thereof; and a switch element, having a first terminal coupled to the second end of the second input capacitor, a second terminal coupled to the first ground end, and a third terminal coupled to the control unit;

wherein in case of a rated voltage of the AC power signal being smaller than 110 Vac, the control unit controls the switch element to complete a switch-ON operation, so as to make a signal channel be formed in the switch element, thereby making the second end of the second input capacitor be coupled to the first ground end via the signal channel, such that the input-end filtering unit executes a signal filtering process by simultaneously using the two first input capacitors and the second input capacitor;

wherein in case of the rated voltage of the AC power signal being in a range between 110 Vac and 264 Vac, the control unit controls the switch element to complete a switch-OFF operation so as to cut off the signal channel, thereby making the input-end filtering unit execute the signal filtering process by merely using two first input capacitors.

2. The fast charging device of claim 1, wherein the device connector is selected from the group consisting of USB electrical connector meeting the second fast charge standard of USB power delivery (USB PD), type-C USB electrical connector and Thunderbolt 3 electrical connector.

3. The fast charging device of claim 1, wherein the mobile electronic device is selected from the group consisting of portable Li-ion battery, wireless charging pad, laptop computer, tablet computer, smartphone, and Bluetooth headset.

4. The fast charging device of claim 1, wherein the rectifier and filter unit comprises:

a diode, being coupled to the first electrical terminal of the secondary winding by an anode terminal thereof; and a filtering capacitor, being coupled to a cathode terminal of the diode and the second ground end by a first end and a second end thereof.

5. The fast charging device of claim 4, wherein the rectifier and filter unit comprises:

a synchronous rectification element, having a first terminal coupled to the first electrical terminal of the secondary winding, a second terminal coupled to the power outputting end, and a third terminal coupled to the control unit; and a filtering capacitor, being coupled to a cathode terminal of the diode and the second ground end by a first end and a second end thereof.

6. The fast charging device of claim 1, wherein the optical coupler comprises:

an LED element, being coupled to the signal transmitting terminal of the voltage detection unit and the second ground end by an anode terminal and a cathode terminal thereof; and a phototransistor, having a base terminal, an emitter terminal and a collector terminal coupled to the control unit, and receiving a light signal transmitted by the LED element by the base terminal.

7. The fast charging device of claim 1, wherein the output-end filtering unit is a π filter.

8. The fast charging device of claim 1, wherein the input-end filtering unit also includes a choke coil that is coupled between the two first input capacitors, such that the input-end filtering unit is a π filter.

9. The fast charging device of claim 1, further comprising a Y capacitor that is coupled to the second ground end and the first ground end by a first end and a second end thereof.

10. The fast charging device of claim 1, further comprising:

a soft start rectifier unit, being coupled between the first electrical terminal of the primary winding, the second electrical terminal of the auxiliary winding, and the control unit; and a DC voltage sensing unit, having a first terminal coupled to the first electrical terminal of the primary winding and a second terminal coupled to the control unit, such that the control unit is able to monitor a voltage level of the DC voltage signal through the DC voltage sensing unit.

11. The fast charging device of claim 10, further comprising:
- a temperature protection unit, being coupled between the soft start rectifier unit, the first ground end and the control unit, and comprising a thermistor and a BJT element;
- a current sensing unit, having a first terminal coupled to the second terminal of the switch unit and a second terminal coupled to the control unit, such that the control unit is able to monitor a current level of the DC voltage signal through the current sensing unit; and
- a voltage clamping unit, being coupled between the first electrical terminal of the primary winding, the first electrical terminal of the secondary winding, and the second terminal of the switch unit, and comprising a resistor, a capacitor and a diode.

12. The fast charging device of claim 11, further comprising:
- a circuit board, wherein the AC power coupling interface, the device connector, the bridge rectifier unit, the input-end filtering unit, the transformer unit, the switch unit, the rectifier and filter unit, the output-end filtering unit, the voltage detection unit, the control unit, the optical coupler, the Soft start rectifier unit, the DC voltage sensing unit, the temperature protection unit, the current sensing unit, and the voltage clamping unit are disposed on a front surface and/or a rear surface of the circuit board; and
- a housing for accommodating the circuit board.

* * * * *